UNITED STATES PATENT OFFICE.

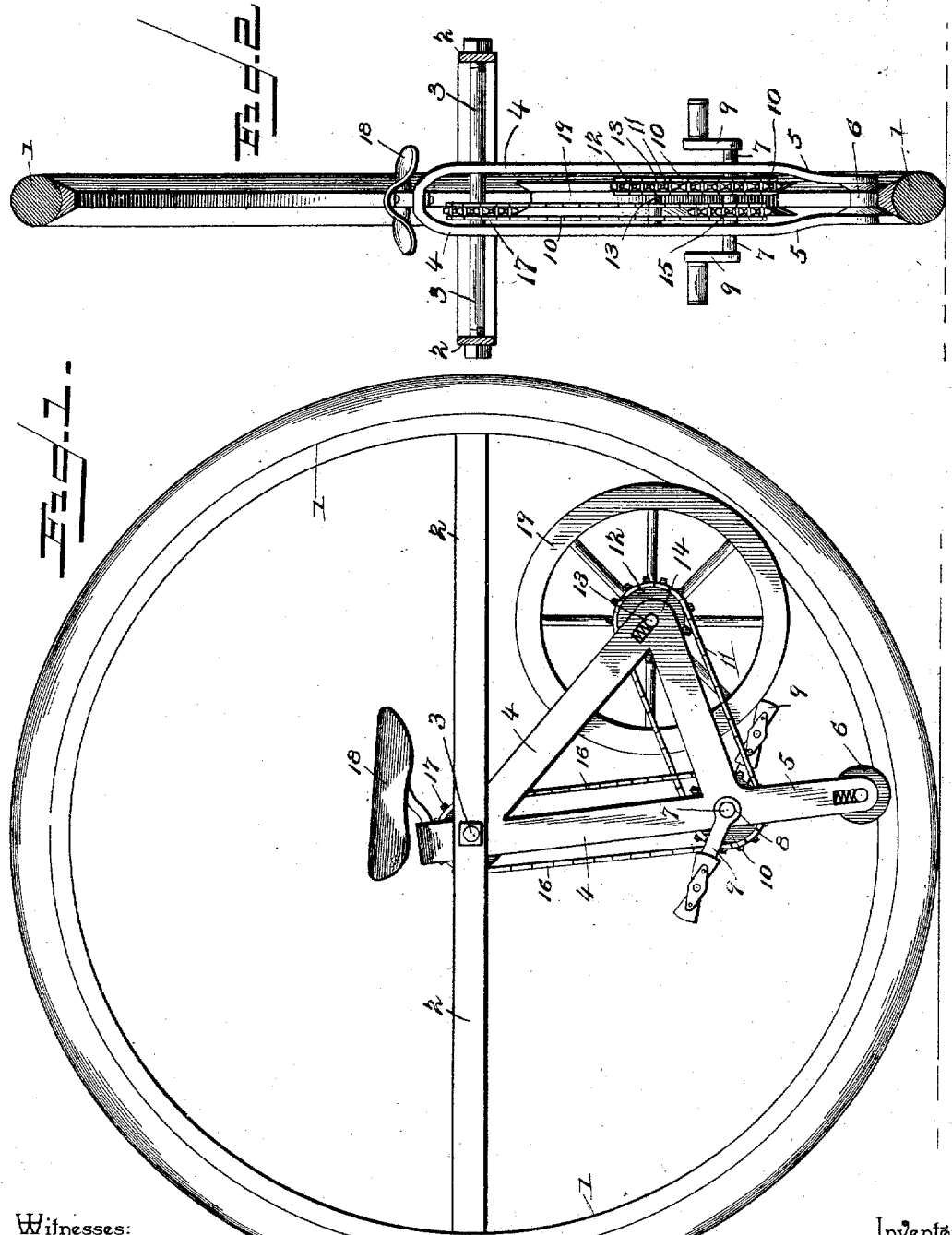

FABIAN H. ARMISTEAD, OF ROANOKE, ASSIGNOR OF ONE-FOURTH TO H. T. PARRISH, S. J. KENNEDY, A. M. CASSEL, AND GEORGE RICHARDSON, OF FARMVILLE, VIRGINIA.

UNICYCLE.

SPECIFICATION forming part of Letters Patent No. 514,612, dated February 13, 1894.

Application filed May 9, 1893. Serial No. 473,560. (No model.)

*To all whom it may concern:*

Be it known that I, FABIAN H. ARMISTEAD, a citizen of the United States, residing at Roanoke, in the county of Roanoke and State of Virginia, have invented a new and useful Unicycle, of which the following is a specification.

My invention relates to improvements in unicycles; the objects in view being to produce a machine of cheap and simple construction, that is equally balanced and adapted to operate smoothly and with a minimum amount of friction, and to be readily controlled by the operator.

Various other objects and advantages of the invention will appear in the following description, and the novel features thereof will be particularly pointed out in the claims.

Referring to the drawings:—Figure 1 is a side elevation of a machine of the unicycle type embodying my improvements. Fig. 2 is a vertical transverse sectional view of the same.

Like numerals of reference indicate like parts in both figures of the drawings.

In practice I employ a large or main wheel 1 provided with a plurality of bowed spokes 2, which spokes radiate from a central hub or shaft 3 rigidly connected therewith. The number of spokes may be increased or decreased to suit the fancy of the manufacturer. Forming bearings for loose rotation of the shaft 3 is a pair of opposite substantially triangular frames 4, the same having bearings formed at each of its angles, and from the lower angles of the frames there project arms 5, likewise having bearings. In the bearings of the arms 5 a flanged or grooved wheel 6 is mounted for rotation, the same being designed to revolve upon the inner periphery of the main wheel 1, which latter wheel, as shown in section in Fig. 2, is beveled at its inner face for the reception of said wheel 6. A transverse power shaft 7 is mounted in the lower bearing 8 of the triangular frames 4, and said power shaft is provided with suitable cranks 9, by which the same may be operated. The shaft 7 also carries a sprocket wheel 10, and the same is geared by a chain 11 to the sprocket wheel 12 which is mounted upon a shaft 13 journaled in the bearings 14 at the rear end of the frame 4. Mounted upon the shaft 13 is a drive-wheel 19, the same, like the guide-wheel 6, being grooved or flanged so as to fit over the beveled inner periphery of the main wheel 1. The shaft 7 is further provided with a second sprocket wheel 15, and the same is by means of a sprocket-chain 16 connected with a sprocket wheel 17 rigidly mounted upon the axle 3 of the main wheel 1.

Suitably supported by the upper end of the frame 4 is a saddle or seat 18.

This completes the construction of the machine, and the operation will at once be apparent. The rider perched upon the saddle 18 operates the drive-shaft 7 through the medium of the cranks, which it will be understood are provided with the usual pedals for the accommodation of the feet of the rider, and the motion of the shaft is imparted to the axle 3 and to the shaft 13 of the drive wheel 19, so that as a result the main wheel 1 is driven at both its center and rim and glides smoothly along, a minimum amount of friction being generated by the arrangement of wheels and connections herein shown, the weight of the rider resting on the rim reducing all strain to a minimum.

I do not limit my invention to the various details of construction herein shown and described, but hold that I may vary the same to any degree and extent within the knowledge of the skilled mechanic.

Having described my invention, what I claim is—

In a unicycle, the combination with the main wheel, the spokes, the axle, and a sprocket wheel mounted thereon, of a bearing frame at each side of the axle, said bearing frames being of substantially triangular shape and provided at their lower angles with extension-arms 5 having bearings, the shaft 7 mounted in the lower bearings of the triangular frame and provided with cranks, the sprocket wheel 8 arranged upon said shaft, the chain 16 connecting the sprocket wheel 8 with the sprocket wheel of the axle, the lower guide wheel 6 journaled in the arms, the rear shaft 13 mounted in bearings 14, located at the rear angles of the frames, the drive wheel 19, the sprocket wheel 12, the second or companion sprocket wheel on the shaft 7, and the sprocket chain 11 between said latter sprocket wheel and the sprocket wheel 12, substantially as specified.

In testimony that I claim the foregoing as my own I have hereto affixed my signature in the presence of two witnesses.

FABIAN H. ARMISTEAD.

Witnesses:
J. H. SIGGERS,
GERTRUDE M. ATHEY.